United States Patent
Pilebro et al.

(10) Patent No.: US 9,518,787 B2
(45) Date of Patent: Dec. 13, 2016

(54) THERMAL ENERGY STORAGE SYSTEM COMPRISING A COMBINED HEATING AND COOLING MACHINE AND A METHOD FOR USING THE THERMAL ENERGY STORAGE SYSTEM

(71) Applicant: Skanska Sverige AB, Stockholm (SE)

(72) Inventors: Hans Pilebro, Enebyberg (SE); Tobias Strand, Farsta (SE); Rasmus Vestin, Bromma (SE)

(73) Assignee: SKANSKA SVERGIE AB, Stockholm (SE)

( * ) Notice: Subject to any disclaimer, the term of this patent is extended or adjusted under 35 U.S.C. 154(b) by 72 days.

(21) Appl. No.: 14/439,786

(22) PCT Filed: Nov. 1, 2013

(86) PCT No.: PCT/SE2013/051283
§ 371 (c)(1),
(2) Date: Apr. 30, 2015

(87) PCT Pub. No.: WO2014/070098
PCT Pub. Date: May 8, 2014

(65) Prior Publication Data
US 2015/0292810 A1   Oct. 15, 2015

(30) Foreign Application Priority Data
Nov. 1, 2012   (SE) ........................ 1251241

(51) Int. Cl.
*F28D 20/00*   (2006.01)
*F24D 3/08*   (2006.01)
*F24D 19/10*   (2006.01)

(52) U.S. Cl.
CPC .............. *F28D 20/0034* (2013.01); *F24D 3/08* (2013.01); *F24D 19/1066* (2013.01);
(Continued)

(58) Field of Classification Search
CPC .............. F28D 20/0039; F28D 20/0052; F28D 20/0034; F28D 2020/0069; F24D 19/1066; F24D 3/08; F24D 2200/11; F24D 2200/123; Y02E 60/142; Y02B 10/40
(Continued)

(56) References Cited

U.S. PATENT DOCUMENTS

| 1,639,172 A | 8/1927 | Forcada |
| 2,737,789 A | 3/1956 | Ruff |

(Continued)

FOREIGN PATENT DOCUMENTS

| CA | 2413819 | 6/2004 |
| CN | 102459824 | 5/2012 |

(Continued)

OTHER PUBLICATIONS

Extended European Search Report, European Application No. 13851337, mailed Dec. 17, 2015 (2 pages).

(Continued)

*Primary Examiner* — Mohammad M Ali
(74) *Attorney, Agent, or Firm* — Kagan Binder, PLLC

(57) ABSTRACT

The present invention relates to a thermal energy storage system comprising an energy storage (2) having a vertical temperature gradient and an internal combined heating and cooling machine (15). The internal combined heating and cooling machine (15) is adapted for retrieving energy having a first temperature from the energy storage, while simultaneously returning heated energy having a second higher temperature and cooled energy having a third lower temperature. The invention also relates to a method for using the thermal energy storage system.

10 Claims, 1 Drawing Sheet

(52) U.S. Cl.
CPC ..... *F28D 20/0039* (2013.01); *F28D 20/0052* (2013.01); *F24D 2200/11* (2013.01); *F24D 2200/123* (2013.01); *F28D 2020/0069* (2013.01); *Y02B 10/40* (2013.01); *Y02E 60/142* (2013.01)

(58) Field of Classification Search
USPC .............................................. 62/160; 165/10
See application file for complete search history.

(56) References Cited

U.S. PATENT DOCUMENTS

| | | |
|---|---|---|
| 2,766,200 A | 10/1956 | Kaufman |
| 2,818,118 A | 12/1957 | Dixon |
| 2,962,095 A | 5/1961 | Namur |
| 3,097,694 A | 7/1963 | Kerver |
| 3,227,211 A | 1/1966 | Gilchrist |
| 3,402,769 A | 9/1968 | Doggett et al. |
| 3,427,652 A | 2/1969 | Seay |
| 3,448,792 A | 6/1969 | Lawrence |
| 3,470,943 A | 10/1969 | Van Huisen |
| 3,580,330 A | 5/1971 | Maugis |
| 3,593,791 A | 7/1971 | Parker |
| 3,640,336 A | 2/1972 | Dixon |
| 3,679,264 A | 7/1972 | Van Huisen |
| 3,685,330 A | 8/1972 | Funke |
| 3,737,105 A | 6/1973 | Arnold et al. |
| 3,757,516 A | 9/1973 | McCabe |
| 3,786,858 A | 1/1974 | Potter et al. |
| 3,807,491 A | 4/1974 | Van Hulsen |
| 3,817,038 A | 6/1974 | Paull et al. |
| 3,857,244 A | 12/1974 | Faucette |
| 3,863,709 A | 2/1975 | Fitch |
| 3,864,208 A | 2/1975 | Van Huisen |
| 3,878,884 A | 4/1975 | Raleigh |
| 3,921,405 A | 11/1975 | Rosciszewski |
| 3,923,248 A | 12/1975 | Cresswell |
| 3,931,851 A | 1/1976 | Harris et al. |
| 3,939,356 A | 2/1976 | Loane |
| 3,943,722 A | 3/1976 | Ross |
| 3,957,108 A | 5/1976 | Van Huisen |
| 3,965,972 A | 6/1976 | Peterson |
| 3,967,675 A | 7/1976 | Georgii |
| 3,986,339 A | 10/1976 | Janelid |
| 3,986,362 A | 10/1976 | Baciu |
| 3,991,817 A | 11/1976 | Clay |
| 4,008,709 A | 2/1977 | Jardine |
| 4,030,549 A | 6/1977 | Bouck |
| 4,031,952 A | 6/1977 | Contour |
| 4,044,830 A | 8/1977 | Van Huisen |
| 4,047,093 A | 9/1977 | Levoy |
| 4,060,988 A | 12/1977 | Arnold |
| 4,078,904 A | 3/1978 | Galt et al. |
| 4,079,590 A | 3/1978 | Sheinbaum |
| 4,121,429 A | 10/1978 | Grennard |
| 4,137,720 A | 2/1979 | Rex |
| 4,139,056 A | 2/1979 | Schöll |
| 4,143,816 A | 3/1979 | Skadeland |
| 4,147,204 A | 4/1979 | Pfenninger |
| 4,149,389 A * | 4/1979 | Hayes .................. F25B 7/00 62/114 |
| 4,157,730 A | 6/1979 | Despois et al. |
| 4,174,009 A | 11/1979 | Laing et al. |
| 4,194,856 A | 3/1980 | Jahns |
| 4,200,152 A | 4/1980 | Foster et al. |
| 4,201,060 A | 5/1980 | Outmans |
| 4,210,201 A | 7/1980 | O'Hanlon |
| 4,211,613 A | 7/1980 | Meckler |
| 4,219,074 A | 8/1980 | Hansen |
| 4,223,729 A | 9/1980 | Foster |
| 4,234,037 A | 11/1980 | Rogers et al. |
| 4,241,724 A | 12/1980 | Hull |
| 4,271,681 A | 6/1981 | Schertz |
| 4,286,141 A | 8/1981 | MacCracken |
| 4,286,574 A | 9/1981 | Vrolyk et al. |
| 4,290,266 A | 9/1981 | Twite et al. |
| 4,291,751 A | 9/1981 | Wolf |
| 4,297,847 A | 11/1981 | Clayton |
| 4,345,652 A | 8/1982 | Roque |
| 4,351,651 A | 9/1982 | Courneya |
| 4,361,135 A | 11/1982 | Metz |
| 4,363,563 A | 12/1982 | Hallenius et al. |
| 4,375,157 A | 3/1983 | Boesen |
| 4,392,351 A | 7/1983 | Doundoulakis |
| 4,392,531 A | 7/1983 | Ippolito |
| 4,399,656 A * | 8/1983 | Laing .................. F01K 3/00 165/104.17 |
| 4,401,162 A | 8/1983 | Osborne |
| 4,402,188 A * | 9/1983 | Skala .................. A47J 27/17 165/10 |
| 4,415,034 A | 11/1983 | Bouck |
| 4,418,549 A | 12/1983 | Courneya |
| 4,440,148 A | 4/1984 | Assaf |
| 4,448,237 A | 5/1984 | Riley |
| 4,462,463 A | 7/1984 | Gorham, Jr. |
| 4,476,932 A | 10/1984 | Emery |
| 4,479,541 A | 10/1984 | Wang |
| 4,498,454 A | 2/1985 | Assaf |
| 4,505,322 A | 3/1985 | Larson |
| 4,510,920 A | 4/1985 | Walmet |
| 4,522,254 A * | 6/1985 | Koizumi .............. F28D 20/0039 126/585 |
| 4,554,797 A * | 11/1985 | Goldstein .............. F24D 11/02 62/123 |
| 4,566,527 A | 1/1986 | Pell et al. |
| 4,577,679 A | 3/1986 | Hibshman |
| 4,607,488 A | 8/1986 | Karinthi et al. |
| 4,632,604 A | 12/1986 | McKelvy |
| 4,633,948 A | 1/1987 | Closmann |
| 4,642,987 A | 2/1987 | Csorba et al. |
| 4,652,181 A | 3/1987 | Bergman et al. |
| 4,671,351 A | 6/1987 | Rappe |
| 4,693,301 A | 9/1987 | Baehrle et al. |
| 4,723,604 A | 2/1988 | Emery |
| 4,867,241 A | 9/1989 | Strubhar |
| 4,912,941 A | 4/1990 | Büchi |
| 4,974,675 A | 12/1990 | Austin et al. |
| 4,977,961 A | 12/1990 | Avasthi |
| 5,074,360 A | 12/1991 | Guinn |
| 5,085,276 A | 2/1992 | Rivas et al. |
| 5,088,471 A | 2/1992 | Bottum |
| 5,355,688 A * | 10/1994 | Rafalovich .......... F24D 11/0214 165/104.18 |
| 5,507,149 A | 4/1996 | Dash et al. |
| 5,620,049 A | 4/1997 | Gipson et al. |
| 5,678,626 A * | 10/1997 | Gilles .................. F24F 5/0017 165/62 |
| 5,937,663 A * | 8/1999 | Chen .................. F24F 5/0096 62/238.7 |
| 5,937,934 A | 8/1999 | Hildebrand |
| 5,941,238 A * | 8/1999 | Tracy .................. F24D 11/0221 126/641 |
| 6,098,705 A | 8/2000 | Kim |
| 6,138,614 A | 10/2000 | Shropshire |
| 6,199,515 B1 | 3/2001 | Clarke |
| 6,247,313 B1 | 6/2001 | Moe et al. |
| 6,367,566 B1 | 4/2002 | Hill |
| 6,379,146 B1 | 4/2002 | Zink et al. |
| 6,668,554 B1 | 12/2003 | Brown |
| 6,701,914 B2 * | 3/2004 | Schwarz .............. F28D 20/0052 126/400 |
| 7,007,501 B2 * | 3/2006 | Hu .................. B64D 13/00 62/239 |
| 7,228,908 B2 | 6/2007 | East, Jr. et al. |
| 7,753,122 B2 | 7/2010 | Curlett |
| 8,322,092 B2 | 12/2012 | Isaacs |
| 8,595,998 B2 | 12/2013 | Isaacs |
| 8,596,355 B2 | 12/2013 | Kaminsky et al. |
| 8,770,284 B2 | 7/2014 | Meurer et al. |
| 8,931,553 B2 | 1/2015 | Cannan et al. |
| 9,028,171 B1 | 5/2015 | Seldner |
| 9,080,441 B2 | 7/2015 | Meurer et al. |
| 9,091,460 B2 | 7/2015 | Parrella, Sr. |

(56) References Cited

U.S. PATENT DOCUMENTS

| | | |
|---|---|---|
| 9,181,931 B2 | 11/2015 | McBay |
| 2002/0036076 A1 | 3/2002 | Eastman |
| 2002/0179298 A1 | 12/2002 | Kopko |
| 2004/0031585 A1 | 2/2004 | Johnson, Jr. et al. |
| 2004/0251011 A1 | 12/2004 | Kudo |
| 2006/0107664 A1 | 5/2006 | Hudson et al. |
| 2006/0108107 A1 | 5/2006 | Naukkarinen |
| 2007/0017243 A1 | 1/2007 | Kidwell et al. |
| 2007/0023163 A1 | 2/2007 | Kidwell et al. |
| 2007/0125528 A1 | 6/2007 | Fakheri |
| 2007/0158947 A1 | 7/2007 | Annen et al. |
| 2008/0149573 A1 | 6/2008 | Fein et al. |
| 2008/0163950 A1 | 7/2008 | Andersen et al. |
| 2009/0020265 A1 | 1/2009 | Feinauer et al. |
| 2009/0120090 A1 | 5/2009 | DuBois |
| 2009/0120091 A1 | 5/2009 | DuBois |
| 2009/0211727 A1* | 8/2009 | Yin ................. F24F 5/0046 165/45 |
| 2010/0101767 A1 | 4/2010 | Furui et al. |
| 2010/0230071 A1 | 9/2010 | Slater |
| 2010/0294456 A1 | 11/2010 | Taraba et al. |
| 2011/0041784 A1 | 2/2011 | McAlister |
| 2012/0006503 A1 | 1/2012 | Sun et al. |
| 2012/0030824 A1 | 2/2012 | Hoffman et al. |
| 2012/0037335 A1 | 2/2012 | Asai et al. |
| 2012/0048259 A1 | 3/2012 | Wagner et al. |
| 2012/0132393 A1 | 5/2012 | Pilebro et al. |
| 2012/0149944 A1 | 6/2012 | Zmierczak et al. |
| 2012/0180508 A1* | 7/2012 | Endoh ................. F24D 11/0221 62/159 |
| 2012/0255706 A1 | 10/2012 | Tadayon et al. |
| 2012/0318474 A1 | 12/2012 | Lieskoski |
| 2013/0068418 A1 | 3/2013 | Gotland et al. |
| 2013/0112155 A1 | 5/2013 | Abdel-Rehim et al. |
| 2013/0232973 A1 | 9/2013 | McBay |
| 2013/0333860 A1 | 12/2013 | Stubler |
| 2014/0262137 A1 | 9/2014 | McBay |
| 2014/0318737 A1 | 10/2014 | Kaasa et al. |
| 2015/0013949 A1 | 1/2015 | Arnot |
| 2015/0276325 A1 | 10/2015 | Pilebro |
| 2015/0283565 A1 | 10/2015 | Strand |
| 2015/0292809 A1 | 10/2015 | Pilebro et al. |
| 2015/0354903 A1 | 12/2015 | Pilebro |

FOREIGN PATENT DOCUMENTS

| | | |
|---|---|---|
| CN | 102762948 | 10/2012 |
| DE | 130466 | 4/1978 |
| DE | 2801791 | 7/1979 |
| DE | 2811439 | 9/1979 |
| DE | 100 39 581 | 6/2002 |
| DE | 202006012225 | 10/2006 |
| DE | 102007056720 | 6/2009 |
| DE | 102008001308 | 7/2009 |
| DE | 102012211921 | 9/2014 |
| EP | 0198808 | 10/1986 |
| EP | 0271319 | 6/1988 |
| EP | 0 683 362 | 11/1995 |
| EP | 0819893 | 1/1998 |
| EP | 2031333 | 3/2009 |
| EP | 2078913 | 7/2009 |
| EP | 2085705 | 8/2009 |
| EP | 2141433 | 1/2010 |
| EP | 2418449 | 2/2012 |
| EP | 2 479 517 | 7/2012 |
| EP | 2479517 | 7/2012 |
| FR | 2826436 | 12/2002 |
| GB | 2459955 | 11/2009 |
| JP | S54128818 | 10/1979 |
| JP | 59-231395 | 12/1984 |
| JP | H0220799 | 5/1990 |
| JP | 5-179852 | 7/1993 |
| JP | H11158899 | 6/1999 |
| JP | 2001-193897 | 7/2001 |
| JP | 2002-173946 | 6/2002 |
| JP | 2002-194760 | 7/2002 |
| JP | 3648669 | 2/2005 |
| JP | 38-21938 | 9/2006 |
| JP | 2011-220603 | 11/2011 |
| KR | 10-2011-0046392 | 5/2011 |
| KR | 2012 0077106 | 7/2012 |
| KR | 20120077106 | 7/2012 |
| WO | 83/00526 | 2/1983 |
| WO | 96/14544 | 5/1996 |
| WO | 2007/065001 | 6/2007 |
| WO | 2010/045011 | 4/2010 |
| WO | 2011/016768 | 2/2011 |
| WO | 2011/116736 | 9/2011 |
| WO | 2012/168352 | 12/2012 |
| WO | 2013/173709 | 11/2013 |

OTHER PUBLICATIONS

Extended European Search Report, European Application No. 13852022.6, mailed Oct. 28, 2015 (3 pages).
Riley, Alex. "BBC—Earth—A strange extinct animal made this giant stone corkscrew", Jul. 28, 2016.[Retrieved on Sep. 3, 2016]. Retrieved from the Internet: URL:<http://www.bbc.com/earth/story/20160727-extinct-giant-beavers-made-stone-corkscrews-instead-of-dams>.
"3.5 Hydraulic Gradient and Energy Gradient", 5.4-1 to 5.4-99.
Peletier, Mark A. "Energies, gradient flows, and large deviations: a modelling point of view", Aug. 28, 2012. Version 0.2, pp. 1-31.
De Carli, Michele and Zarella, Angelo. "Modelling and Analysis of Helical Pipe in Ground Heat Exchanger Design", GSHP Associates Technical Seminar: Truly Renewable Heating & Cooling, London, Dec. 5, 2013, pp. 1 -23.
"Iconic underground structures—TunnelTalk Iconic underground structures", Sep 2010. [retrieved on Sep. 3, 2016]. Retrieved from the Internet:URL:<http://www.tunneltalk.com/Discussion-Forum-Sep10-Iconic-underground-structures.php>.
Wikipedia, the free encyclopedia: "List of spiral tunnels and tunnels on a curved alignment". [retrieved on Sep. 3, 2016]. Retrieved from the Internet:< URL://https://en.wikipedia.org/wiki/List_of_spiral_tunnels_and_tunnels_on_a_curved_alignment>.
Pells, P.J. N. "The Sydney Opera House Underground Parking Station".
Wikipedia, the free encyclopedia: "Skolithos". [retrieved on Sep. 3, 2016]. Retrieved from the Internet: URL:<https://en.wikipedia.org/wiki/Skolithos>.
"Analysis of short helical and double U-tube borehole heat exchangers: A simulation-based comparison".(abstract). Applied Energy, Dec. 2013. Available online: Jul. 12, 2013. [retrieved on Sep. 3, 2016].Retrieved from the Internet: <http://zj5lm7ny2a.search.serialssolutions.com/...e=20131201 &aulast=Zarrella,%20Angelo&spage=358&pages=358-370.
Nash, Darren. "Goannas Dig the Deepest, Twistiest Burrows of All—Scientific American Blog Network", Jul. 6, 2015. [retrieved on Sep. 3, 2016]. Retrieved from the Internet<URL:http://blogs.scientificamerican.com/tetrapod-zoology/goannas-dig-the-thedeepest-twistiest-burrows-of-all/.
"Tracing large tetrapod burrows from the Permian of Nei Mongol, China", Chinese Academy of Sciences, Dec. 31, 2013. [retrieved on Sep. 3, 2016]. Retrieved from the Internet<URL:http://phys.org/news/2013-12-large-tetrapod-burrows-permian-nei.html>.

* cited by examiner

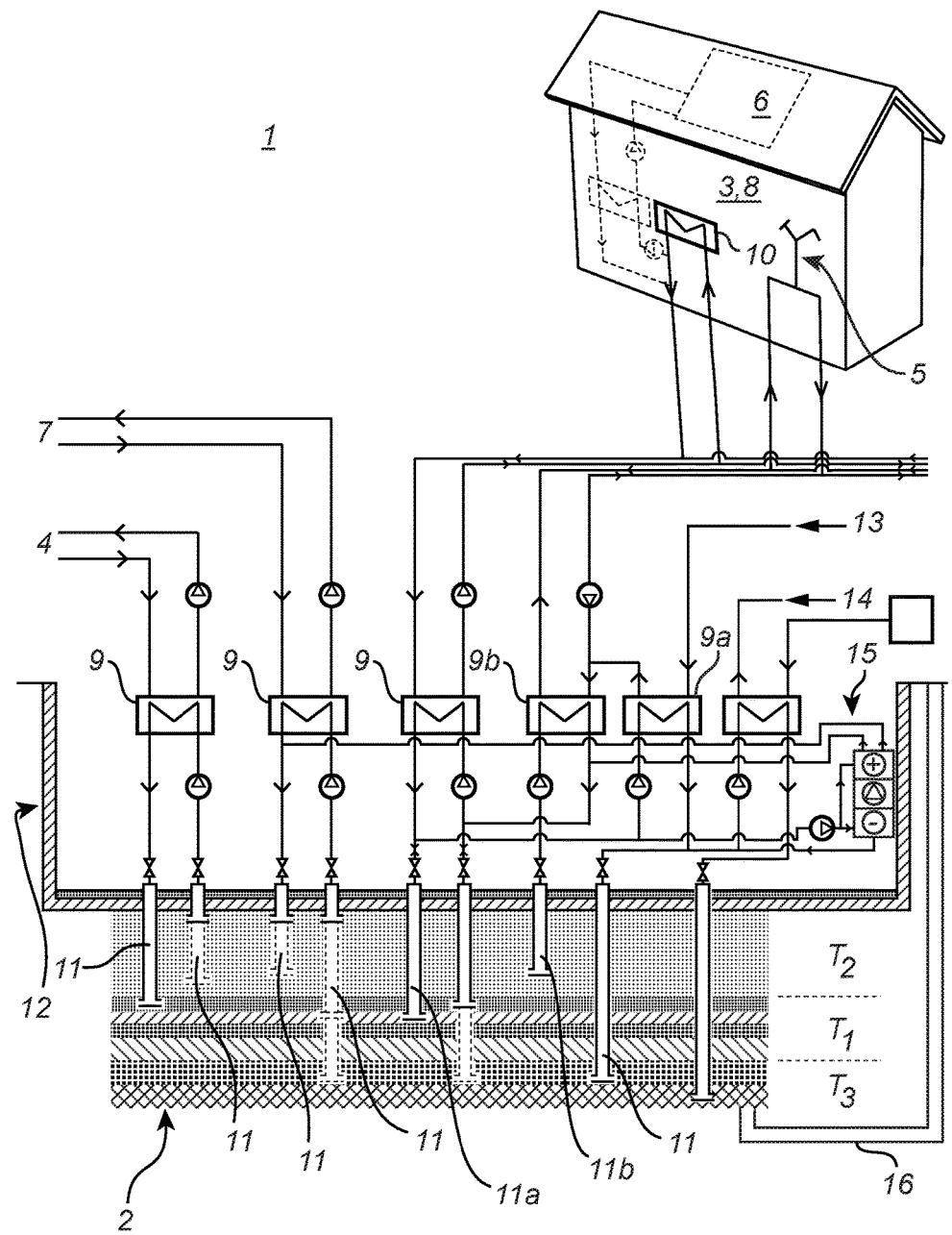

THERMAL ENERGY STORAGE SYSTEM COMPRISING A COMBINED HEATING AND COOLING MACHINE AND A METHOD FOR USING THE THERMAL ENERGY STORAGE SYSTEM

This application claims benefit from International Application No. PCT/SE2013/051283, which was filed on Nov. 1, 2013, which claims priority to Swedish Patent Application No. 1251241-4, which was filed Nov. 1, 2012, the entireties of said patent applications are incorporated herein by reference.

FIELD OF THE INVENTION

The present invention relates to a thermal energy storage system comprising an energy storage having a vertical temperature gradient and an internal combined heating and cooling machine.

BACKGROUND OF THE INVENTION

Electrical energy today is primarily supplied through turbine based electrical generation. The electricity supply to the electrical grid must constantly be balanced against the accumulated electrical consumption and any losses in the grid. When there is unbalance, the frequency of the grid is affected such that an overproduction leads to an increase in frequency and an underproduction leads to a decrease in frequency in relation to the standardized frequency 50 Hz. Some balancing is done by allowing minor variations of the power frequency. If the deviation is too large, the grid is put out of order.

The production of electricity comprises two main parts, base power and load following power. The base power operates at a constant load and is produced by e.g. nuclear plants, coal or gas fired power plants, or combined heat and power plants (CHP). For stabilization of the frequency at 50 Hz momentary regulation (i.e. regulation of variations within seconds) of the rotating mass in the synchronic generators/turbines is of great importance.

For stabilization during longer periods, such as hours up to days, the electrical production and consumption is balanced by regulating the electrical consumption, by switching electrical consumers on or off from the grid, and/or by regulating the power production, i.e. by use of load following power plants such as hydro power plants in Sweden or gas fired power plants at the European continent.

By connecting different AC grids to each other, large multinational grids are created where the total rotating mass cooperates. However, electrical energy generated by solar or wind power has no rotating mass. Therefore, a certain amount of the electricity production still needs to be turbine based or include rotating equipment with no electrical generation. An estimate of the future energy mix in the Swedish grid, corresponding to an annual electrical generation of 55 TWh, is that 25% of the production needs to be turbine based while the remaining 75% can be based on wind power (45 TWh) and solar power (10 TWh).

The ongoing transition to renewable, intermittent electrical energy from wind and sun hence leads to completely different conditions for the energy supply since the electricity production depends on the weather, i.e. the variations are seasonal, daily, hourly, down to within seconds, and since the electrical energy generated by solar or wind power today normally has no rotating mass. In the future this stabilization is expected to be achieved by means of additional regulation of wind power turbines.

Also, any future overproduction of electricity can with use of today's technology be used or disposed of e.g. as waste, for export, or in district heating systems. Waste simply means that surplus energy is kept unused, i.e. that an amount of the solar or wind power plants are shut down in order to reduce the level of electricity production. Export means that surplus electricity is exported to another country. This is however not always possible since there has to be a market to which one can export the electricity. If the power supply in nearby countries, in the future, also develops into a similar wind and power supply, the possibilities for export will be limited. District heating systems means that an amount of the surplus electricity is transmitted into the district heating system by the use of a number of electric boilers. Since surplus exists only a short period of the year, the investment in electric boilers must be very efficient. Further, it is not possible to use all the generated electricity in the district heating system since the surplus production normally occurs during spring and summer at periods when the consumption is low, i.e. the production and the consumption is not balanced. These situations may also be a result of the difficulties in predicting both the weather and the electricity consumption.

Hence, there is a need for an improved energy storage system which utilizes the overproduction of electrical energy and which is used for evening out and regulating any variations in the electricity production, independently of it being seasonal, daily, hourly, or down to within seconds.

SUMMARY OF THE INVENTION

An object according to an aspect of present invention is to provide a system, in which surplus electrical energy can be stored as heat for later use, e.g. for balancing the surplus electrical production towards the electrical consumption during seasons, days, hours, or even seconds.

According to a first aspect of the present invention, these objects are achieved by a thermal energy storage system comprising an energy storage having a vertical temperature gradient and an internal combined heating and cooling machine, the internal combined heating and cooling machine being adapted for retrieving energy having a first temperature from the energy storage, while simultaneously returning heated energy having a second higher temperature and cooled energy having a third lower temperature.

One advantage of the thermal energy storage system is the possibility of optimizing the storage of energy by choosing at which temperature levels the energy is to be retrieved and released, all depending on the specific conditions in the grid and in the energy storage at a given period in time. Other advantages are the utilization of surplus electrical energy in the grid and the possibility of easily balancing the production of electricity against the consumption of electrical energy.

The internal combined heating and cooling machine may comprise at least two heat pumps, in order to simultaneously achieve heating and cooling at high capacity with a maximum coefficient of performance.

Each heat pump may comprise at least two compressors, for facilitating an efficient and flexible thermal energy storage system to increase the thermal capacity and in combination with multiple heat pumps increase the coefficient of performance.

In one embodiment, the internal combined heating and cooling machine is adapted for alternating the connection between the at least two compressors between series connection and parallel connection, for allowing both an increase of storage capacity for heated and cooled fluid as well as an increase of the heating capacity of the storage. Another advantage is that the internal combined heating and cooling machine gives the possibility of optimizing the thermal storage by choosing at which temperature levels the energy is to be retrieved and released, all depending on the specific demands in the district heating and cooling systems and in the energy storage at a given period in time.

The thermal energy storage system may further comprise a pressurized electrical steam boiler arranged within the energy storage system, such that surplus electricity in the electrical grid can be transformed into thermal energy as steam which can be directly injected into the thermal energy storage.

The thermal energy storage system may further comprise at least one immersion heater arranged within the energy storage, such that surplus electricity in the electrical grid can be efficiently transformed into thermal energy and directly in the thermal energy storage.

The thermal energy storage system may further comprise at least one heat-absorbing system.

The heat-absorbing system may be a low temperature system.

The heat-absorbing system may be a high temperature system.

The thermal energy storage system may further comprise a heat-emitting system, for regulating the electrical grid.

The heat-emitting system may comprise a combined heat and power plant, for the possibility of delivering only heat to the energy storage.

The heat-emitting system may comprise an electrical hot water boiler and/or an electrical steam boiler, for peak shaving of electrical surplus energy.

According to a second aspect of the present invention, these objects are achieved by a method for using a thermal energy storage system according to the above, comprising the steps of: retrieving energy from a first level of temperature from the energy storage, returning heated energy having a second higher temperature to a corresponding level of the energy storage or to a heat-emitting system, and returning cooled energy having a third lower temperature to a corresponding level of the energy storage or to a heat-absorbing system.

One advantage of the method of using the thermal energy storage system is the possibility of optimizing the storage of energy by choosing at which temperature levels the energy is to be retrieved and released, all depending on the specific conditions in the electrical grid and in the energy storage at a given period in time. Other advantages are the utilization of surplus electrical energy in the grid and the possibility of easily balancing the production of electricity against the consumption of electrical energy.

Generally, all terms used in the claims are to be interpreted according to their ordinary meaning in the technical field, unless explicitly defined otherwise herein. All references to "a/an/the [element, device, component, means, etc]" are to be interpreted openly as referring to at least one instance of said element, device, component, means, etc., unless explicitly stated otherwise. Further, by the term "comprising" it is meant "comprising but not limited to" throughout the application.

BRIEF DESCRIPTION OF THE DRAWING

This and other aspects of the present invention will now be described in more detail, with reference to the appended drawing showing a currently preferred embodiment of the invention.

FIG. 1 shows a schematic view of an energy storage system according to an embodiment of the invention.

DETAILED DESCRIPTION

FIG. 1 illustrates an energy storage system according to a first embodiment of the invention. The system comprises an energy storage 2, which may be a tank, an underground cavern, or a thermal energy storage designed for high performance on input/output of energy and a large seasonal storage capacity.

In the energy storage 2, energy of different temperatures is stored. The upper layers of the energy storage have higher temperatures than the cooler, lower layers. There are also layers having intermediate temperatures in the transition zone there between. The temperatures within the layers of the energy storage can be defined as temperature intervals $T_1$, $T_2$, and $T_3$. These intervals may be adapted to any specific working conditions. As a mere example, the first temperature interval $T_1$ is within the range of 15° C. to 65° C., the second temperature interval $T_2$ is within the range of 50° C. to 100° C., and the third temperature interval $T_3$ is within the range of 4° C. to 25° C. The temperatures in interval $T_2$ may be higher during periods of time, for example up to 150° C.

The layering within the energy storage 2 is due to the differences in density between fluid, i.e. liquid water, having different temperatures. Warm liquid water has a lower density than cooler water in the range above 4° C., which causes water of different temperatures to be placed at different vertical levels within the energy storage, i.e. vertical temperature stratification. The difference in densities generates a gradient flow during the extraction of heat from the energy storage as warm water, having a lower density, flows upwards through the storage to a heat exchanger where it is cooled down. In a return pipe, the difference in densities generates a downward flow of colder water. This results in two water pillars of different density causing a gravitational force, which can be used for gradient flow, in order to reduce the consumption of electrical energy. While charging the energy storage with heat the effect is reversed, and an additional electrical energy source such as a pump or a motor has to be added to drive the flow.

Since charging of the energy storage is mainly performed during the summer while discharging is mainly performed during the winter, this implies that additional electric energy is needed for pumping during the summer but may be generated during the winter, when the demand and cost is higher, i.e. seasonal storage of electric energy. The additional electrical energy will be supplied by a pump with an electrical motor in the summer. The same pump-electrical motor will be used as a turbine-electrical generator during the winter. A large vertical height of the energy storage will increase this effect.

In order to use the full potential of the storage, it is important to use the different, available temperatures effectively. One condition is that the storage is provided with inlets and outlets at different heights. Hence, there are a number of energy communication means 11, e.g. telescopic pipes, which run from a processing area, and which are arranged to retrieve a portion of the energy from the energy storage at a suitable vertical level of the energy storage so as to allow processing of the energy by means of at least one heat exchanger 9. By energy communication means is, in this embodiment, meant fluid communication means. The energy communication means are further arranged to return the processed energy to the energy storage at a suitable vertical level of the energy storage.

The energy storage 2 may be connected to a heat-absorbing system 3, 4, and/or a heat-emitting system 7 via heat exchangers 9.

As an example, a heat-absorbing system 3 can be a low temperature system such as a heating system for heating of buildings. The first heat-absorbing system 3 is connected to a heat exchanger 10. Energy of a first temperature, e.g. from temperature interval $T_1$, is retrieved from the energy storage 2 and is used for heating buildings using the heat exchanger 10. Even though FIG. 1 shows only one building, it is possible, or even preferable, to connect the arrangement to a plurality of buildings. The heat-absorbing system 3 can also be used as a heat-emitting system, collecting heat from the consumers in the system.

Another example of a heat-absorbing system 4 is a high temperature system, preferably a district heating system. The heat-absorbing system 4 can be charged with energy having a temperature within interval $T_2$ taken from the energy storage 2, or with energy having a temperature within interval $T_2$ taken directly from an internal combined heating and cooling machine 15. The internal combined heating and cooling machine 15 is discussed in more detail below. The heat-absorbing system 4 can also be used as a heat-emitting system, collecting heat from the consumers in the system.

The heat-emitting system 7 provides energy which may be produced by an industrial facility or other sources of waste heat, a combined heat and power plant (CHP), solar panels for electrical generation and/or heating, a heat pump, a bio fuel boiler, an electrical hot water boiler and/or an electrical steam boiler, or a fossil fuel boiler. For the use as arrangements for regulating of the electrical grid, the combined heat and power plant and the electrical hot water boiler and/or electrical steam boiler are the most useful and important arrangements.

A combined heat and power plant (CHP) arranged in the heat-emitting system 7 generates both heat and power, typically in a ratio of 2:1 for large scale plants. During periods when the price for electricity is low, an energy production without electrical generation may be preferred. The entire boiler capacity is at this point generated as heat, i.e. 150% of the normal heat generation. If the combined heat and power plant is advanced, the ratio may be 1:1 and the boiler capacity 200%. However, the condenser in the plant and some additional equipment such as a steam transformer (for transforming superheated steam into saturated steam) is required within the plant. In combination with the energy storage 2, the turbine can be connected to the electrical grid by a synchronic generator and be operated without electrical generation during day time, delivering only heat to the energy storage. If required during night, the combined heat and power plant can generate also electricity at full power (wind/solar compensation). The addition of a combined heat and power plant, operated in combination with a thermal energy storage as described above, means that a rotating mass is included in the system which compensates for grid variations within seconds.

An electrical hot water boiler and/or an electrical steam boiler arranged in the heat-emitting system 7 may be used for peak shaving of electrical surplus energy, for example for consuming electricity during daytime (wind/solar peak-shaving).

The above mentioned combined heat and power plant and electrical hot water boiler and/or an electrical steam boiler may be either a new arrangement or an already existing arrangement.

The system further comprises an internal heating and cooling machine 15, which is connected to the energy storage 2. In one aspect, the system is used in order to increase the energy storage capacity of the energy storage 2 for heating and cooling purposes. In another aspect, the system is used for increasing the heating capacity of the storage.

Preferably, the internal heating and cooling machine 15 comprises at least two heat pumps. The internal heating and cooling machine 15 is connected to the energy storage 2 by energy communication means 11 in the same way as described above.

As one example, the internal heating and cooling machine 15 retrieves energy from one level of the temperature interval $T_1$ from the energy storage, while simultaneously returning heated energy having a higher temperature to the interval $T_2$ and cooled energy having a lower temperature to the interval $T_3$, to the corresponding level in the energy storage or e.g. directly to the heat-absorbing system 4. Energy could however also be retrieved from one level of the temperature interval $T_1$ and returned to a warmer, i.e. upper, level of the same temperature interval $T_1$ and a cooler, i.e. lower level of the same temperature interval $T_1$. Hence, the heated and cooled energy can be returned to any fluid layer within the energy storage being arranged above and below the level where fluid is retrieved, i.e. at levels having higher and lower temperatures.

As mentioned above, the internal heating and cooling machine 15 comprises at least two heat pumps. Each heat pump comprises at least two compressors, which can be are connected both in series and in parallel on the refrigerant side of the heat pump. The number of heat pumps and the number of compressors within each heat pump can however be any suitable number. The larger the number of heat pumps/compressors, the more efficient the internal heating and cooling machine 15 is. This must however be weighed against the increase in costs that an increase in number of components leads to.

The internal heating and cooling machine 15 retrieves energy from a first level of the energy storage within temperature interval $T_1$ from, e.g. an intermediate temperature level. The heat pumps are used for simultaneously converting this energy into energy for both heating and cooling purposes. The energy for heating and cooling is returned to the correct, corresponding temperature levels in the energy storage or e.g. transmitted directly into a heat-absorbing system 4 such as a district heating system. Each heat pump may use a different refrigerant. In order to achieve a maximum coefficient of performance (COP), the flow over the water side of the evaporators, condensers, and sub-coolers will be arranged in series in order to reduce the needed temperature lift across each heat pump.

In a first example, the first and second heat pumps each comprise at least two compressors connected in series. Serial connection is preferably used when the price of electricity is low. In this example, the heat pumps will generate energy for the upper temperature interval $T_2$ (95° C.) and for the lower temperature interval of $T_3$ (5° C.), using energy from temperatures interval $T_1$ (45° C.). A coefficient of performance COP for heating of 3-4 is achieved. When the cooling effect is included, the COP is 5-6. The actual value depends on the number of heat pumps, the number of compressors, and the efficiency of the system.

In a second example, the first and second heat pumps each comprise at least two compressors connected in parallel. Parallel connection is preferably used when the price of electricity is relatively high. In this example, the heat pumps will generate energy for the upper temperature interval $T_2$ (90-95° C.) and for the intermediate temperature interval $T_1$ (40° C.), using energy from the upper level of temperature interval $T_1$ or the lower level of temperature interval $T_2$ (65° C.). A COP for heating and cooling which is approximately three times higher than the COP for compressors connected in series is achieved. The actual value depends on the number of heat pumps, the number of compressors, and the efficiency of the system.

In a third example, the first and second heat pumps also comprise at least two compressors each, connected in parallel. In this example, the heat pumps will generate energy for the intermediate temperature interval $T_1$ (55° C.) and for the lower temperature interval $T_3$ (5° C.), using energy from the upper level of temperature interval $T_3$ or the lower level of temperature interval $T_1$ (20° C.). A COP for heating and cooling which is approximately three times higher than the COP for compressors connected in series is achieved. The actual value depends on the number of heat pumps, the number of compressors, and the efficiency of the system.

The parallel connection according to the second illustrates how energy at an intermediate temperature level can be transformed into high temperatures corresponding to conventional district heating levels and simultaneously generate energy at temperatures corresponding to a low temperature system. In the third example, the same equipment can extract energy from the energy storage at a lower level in order to optimize the production of cooling energy at the 5° C. temperature level and for producing temperatures for a low temperature system.

One advantage of the above described thermal energy storage system is hence the possibility of optimizing the storage of energy by choosing at which temperature levels the energy is to be retrieved and released, all depending on the specific conditions in the grid and in the energy storage at a given period in time.

The alternative operation of the compressors having both series and parallel connection may require different sizes of the compressors, corresponding to the number of compressor units operating in series. In this arrangement the compressors can be connected to one common motor. Alternatively, the compressors may be of the same size but will, in series connection, require a speed regulation between the compressor and the motor. Different arrangements can be used for that purpose, such as mechanical gears or frequency regulation of electrical motors. Use of hydraulic motors or steam turbines is possible instead of electrical motors.

The energy storage system may further be provided with additional energy consuming devices, such as a pressurized electrical boiler, providing indirect heating into the energy storage 2, and/or an immersion heater, providing direct heating into the energy storage 2. The use of such devices is preferable during extreme electricity surplus such as when it is very sunny or windy at the same time as the electricity consumption is low. In this case, the devices are activated and hence consume the surplus electricity such that an overload of the network is avoided.

The pressurized electrical boiler, arranged at ground surface, generates thermal energy in the form of steam which is injected directly into the energy storage. The steam is distributed directly into the energy storage 2, via at least one, preferably several, vertical steam pipes provided with outlet nozzles, at the bottom part of temperature interval $T_1$ or the upper part of temperature interval $T_3$. Depending on the height/depth of the storage, the static liquid pressure at the boiler will allow for energy transfer related to a temperature related to the actual pressure. As an example, this is done in an energy storage with a water depth of 150 m at a temperature of around 200° C. This temperature decreases quickly due to diffusion into the surrounding fluid (compare to a "silent kettle" in a feed-water tank to a boiler). The fluid circulating within a boiler needs to be as pure as possible with a minimum of suspended solids and dissolved impurities which cause e.g. corrosion, foaming, or scaling. Therefore, fluid, e.g. water, to the boiler is pumped from the storage via a water treatment plant which cleans the fluid to a level which is sufficient for the boiler (e.g. deionized water). This water treatment will hence also be a part of the cleaning of the fluid in the energy storage 2. If the energy storage is completely filled with water, water shall be pumped from the expansion volume for the storage. Deionized water will be stored in a buffer tank to reduce the size of the water treatment plant and to allow for peak supply to the boiler.

Immersion heaters generate electrical energy directly into the energy storage as heat. At least one, preferably several, immersion heaters are arranged at the bottom part of temperature interval $T_1$ or the upper part of temperature interval $T_3$. Depending on the height/depth of the energy storage 2, the static liquid pressure at the immersion heater will allow for energy transfer at a temperature related to the actual pressure in the energy storage 2. As an example, this is done in an energy storage with a water depth of 150 m (approx. 15 bar) at a temperature of around 200° C. Transfer of heat from the immersion heaters is performed via gradient flow. The temperature close to the immersion heaters decreases quickly due to diffusion into the surrounding fluid. This is a robust design as there are no moving parts.

Steam injection pipes and immersion heaters installed in the energy storage 2 will be installed in vertical channels/pipes in order to allow for maintenance and service from a processing area or tunnel above the energy storage 2.

The person skilled in the art realizes that the present invention by no means is limited to the preferred embodiments described above. On the contrary, many modifications and variations are possible within the scope of the appended claims.

The invention claimed is:

1. A thermal energy storage system comprising an energy storage (2) having a vertical temperature gradient and an internal combined heating and cooling machine (15),
said internal combined heating and cooling machine (15) being adapted for retrieving fluid having a first temperature from the energy storage, while simultaneously returning heated fluid having a second higher temperature and cooled fluid having a third lower temperature, wherein said internal combined heating and cooling machine (15) comprises at least two heat pumps, wherein each heat pump comprises at least two compressors, and wherein said internal combined heating and cooling machine (15) is adapted for alternating the connection between said at least two compressors between series connection and parallel connection.

2. The thermal energy storage system according to claim 1, further comprising a pressurized electrical steam boiler arranged within said energy storage system such that surplus electricity in an electrical grid can be transformed into thermal energy as steam which can be directly injected into the thermal energy storage (2).

3. The thermal energy storage system according to claim 1, further comprising at least one immersion heater arranged within said energy storage (2).

4. The thermal energy storage system according to claim 1, further comprising at least one heat-absorbing system (3, 4).

5. The thermal energy storage system according to claim 1, wherein at least one of said heat-absorbing system (3) is a low temperature system.

6. The thermal energy storage system according to claim 1, wherein at least one of said heat-absorbing system (4) is a high temperature system.

7. The thermal energy storage system according to claim 1, further comprising a heat-emitting system (7).

8. The thermal energy storage system according to claim 4, wherein said heat-emitting system (7) comprises a combined heat and power plant.

9. The thermal energy storage system according to claim 4, wherein said heat-emitting system (7) comprises an electrical hot water boiler and/or an electrical steam boiler.

10. A method for using a thermal energy storage system according to claim 1, comprising the steps of:
   retrieving fluid from a first level of temperature from the energy storage (2),
   returning heated fluid having a second, higher temperature to a corresponding level of said energy storage (2) or to a heat-emitting system (7), and
   returning cooled fluid having a third, lower temperature to a corresponding level of said energy storage (2) or to a heat-absorbing system (3, 4).

* * * * *